Patented Feb. 20, 1940

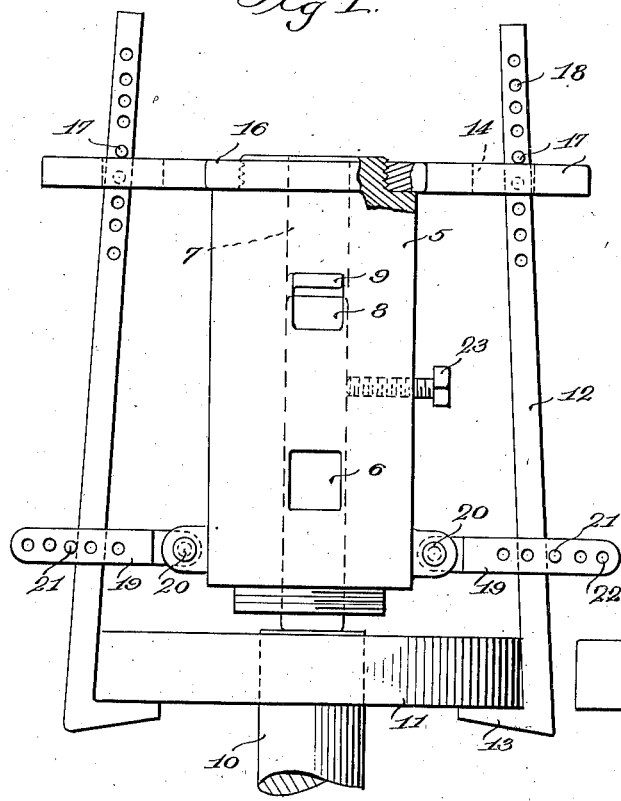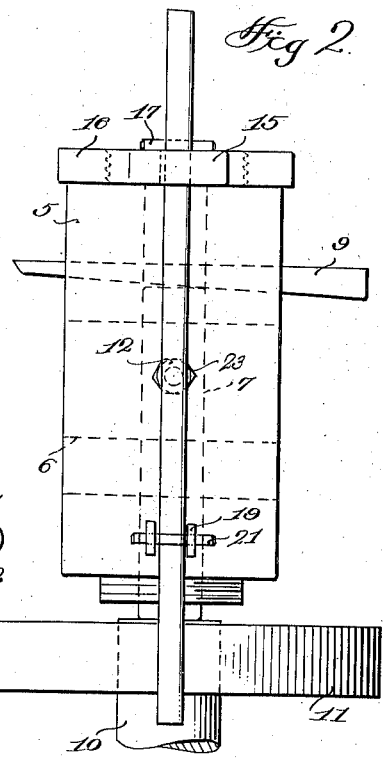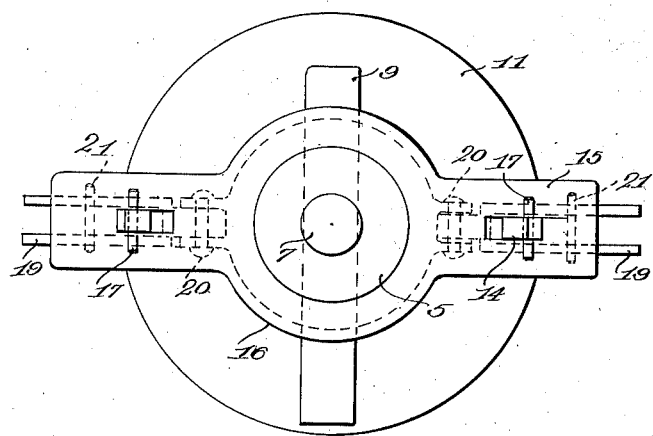

2,191,021

UNITED STATES PATENT OFFICE 2,191,021

PULLING DEVICE

Ralph Ladd, Kelso, Wash.

Application September 19, 1938, Serial No. 230,729

1 Claim. (Cl. 29—85)

This invention relates to improvements in pulling devices for removing gears, couplings, bearings and the like from shafts.

It is an object of the invention to provide a puller having adjustable arms for connecting the device to the part to be removed from a shaft and a plunger adapted to be driven against the end of the shaft for exerting a pull on the arms to forcibly remove the part.

Another object of the invention is to provide a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation of the device, Fig. 2 is a similar view taken at right angles to Fig. 1, and, Fig. 3 is an end view of the same.

In the drawing, wherein for the purpose of illustration I have shown a preferred embodiment of my invention, the numeral 5 denotes a tubular body having transverse passages 6, at spaced intervals, intersecting the bore 7 of the body and slidably mounted in the bore 7 is a plunger 8 adapted to be driven by a wedge bar 9 inserted in the passages 6 into contact with one end of the plunger. The opposite end of the plunger projects beyond the end of the body 5 and is adapted to engage the end of the shaft 10 on which a gear, coupling or bearing 11 that is to be removed is mounted.

Pulling rods 12 are disposed on diametrically opposite sides of the body and extend longitudinally thereof having hooks 13 at one end adapted to engage over the periphery of the gear, coupling or bearing 11. The opposite ends of the rods 12 extend through slots 14 in the lateral arms 15 of the collar 16 threaded on the outer end of the body being adjustably secured in the slots 14 in the lateral arms 15 by pins 17 inserted in one of the series of apertures 18 in the rods. Bifurcated lugs 19 are pivotally attached, as at 20, to the sides of the body 5 to receive the rods 12 and pins 21 inserted in the apertures 22 of the lugs permits the rods 12 to be laterally adjusted to secure the hooks 13 in engagement with the gear, coupling or bearing 11. A set screw 23 is mounted in the side of the body for securing the plunger 8 rigid while removing the wedge to insert a metal disc in the bore 7 to increase the length of the plunger, so that the wedge can drive the plunger further beyond the end of the body when necessary.

In operation, the body 5 is connected with the gear, coupling or bearing 11 to be removed from the shaft 10 by engaging the hooks 13 of the rods 12 over the periphery of the same, the rods 12 being adjustable longitudinally in the arms 15 and laterally in the lugs 19 so as to aline the body with the end of the shaft 10. Upon inserting the wedge 9 in one of the passages 6 in contact with the inner end of the plunger 8, it will be seen that when force is applied to the wedge the plunger will be driven against the end of shaft 10 thereby exerting a pull on rods 12 to forcibly remove the gear, coupling or bearing from the shaft 10.

It is to be understood that the form of my invention herein shown and described is to be taken as a preferred example of the same and that certain changes in the shape, size and arrangement of the parts may be made without departing from the spirit of the invention or the scope of the subjoined claim.

Having thus described my invention, I claim:

A pulling device for removing gears and the like from a shaft comprising a tubular body having transverse passages intersecting the bore of said body, opposed arms extending laterally from one end of said body having slots therein, pulling rods extending through the slots of said arms having a series of apertures, pins insertable in the apertures of said rods for adjusting the rods longitudinally, bifurcated lugs pivotally attached to the opposite end of said body and adapted to extend laterally therefrom to receive said rods, said lugs having a series of apertures, pins insertable in the apertures of said lugs to adjust said rods laterally of the body, hooks on the ends of said pulling rods for engaging the gear, a plunger slidably mounted in the bore of said body, a wedge insertable in the transverse passages of said body for driving said plunger against the end of the shaft and a set screw passing through said body for engagement with said plunger.

RALPH LADD.